(12) United States Patent
Lindinger

(10) Patent No.: US 6,186,586 B1
(45) Date of Patent: Feb. 13, 2001

(54) OPENABLE MOTOR VEHICLE ROOF WITH PROTECTION AGAINST PINCHING

(75) Inventor: Franz Lindinger, München (DE)

(73) Assignee: Webasto Karosseriesysteme GmbH, Stockdrof (DE)

( * ) Notice: Under 35 U.S.C. 154(b), the term of this patent shall be extended for 0 days.

(21) Appl. No.: 09/362,039

(22) Filed: Jul. 28, 1999

(30) Foreign Application Priority Data

Jul. 28, 1998 (DE) .............................................. 198 33 811

(51) Int. Cl.$^7$ ...................................................... B60J 7/057
(52) U.S. Cl. .................... 296/214; 296/216.07; 296/223; 49/28
(58) Field of Search ................ 296/214, 216.06–216.09, 296/223

(56) References Cited

U.S. PATENT DOCUMENTS 5,592,060  1/1997  Racine et al. ........................ 318/469

FOREIGN PATENT DOCUMENTS

| 3248413 | * | 7/1983 | (DE) | ..................................... 296/214 |
| 3527405 | * | 2/1987 | (DE) | ..................................... 296/223 |
| 37 06 450 |  | 9/1987 | (DE) . |  |
| 195 13 971 |  | 10/1995 | (DE) . |  |

* cited by examiner

Primary Examiner—Dennis H. Pedder
(74) Attorney, Agent, or Firm—Nixon Peabody LLP; David S. Safran

(57) ABSTRACT

A motor vehicle roof including a roof panel with a roof opening, at least partially transparent cover which covers the roof opening and being selectively movable to at least partially clear the roof opening, a headliner positioned underneath the roof opening and being selectively movable to at least partially clear the roof opening, a sealing element mounted to the roof panel in a manner that the sealing element adjoins the cover from underneath the cover to seal the motor vehicle roof when the cover is in a closed position, and a sensor provided in the sealing element for sensing application of force in excess of a threshold value which is indicative of an object being pinched between a front edge of the roof opening and at least one of the cover and/or the headliner.

15 Claims, 2 Drawing Sheets

OPENABLE MOTOR VEHICLE ROOF WITH PROTECTION AGAINST PINCHING

BACKGROUND OF THE INVENTION

1. Field of the Invention

The present invention relates to motor vehicle roofs with a roof opening and a movable cover which covers the roof opening, the cover being selectively movable to at least partially clear the roof opening. More particularly, the present invention relates to such motor vehicle roofs which include a sealing element with an integrated sensor for sensing an object being pinched between the roof opening and the cover.

2. Description of the Related Art

An example of a motor vehicle roof of the type to which this invention is directed is illustrated in the German Patent DE 37 06 450 C2, which shows a sliding roof without a movable headliner. The sealing element which is mounted on a stationary roof part which projects into the roof opening, is made in two parts, the sensor being made as an air-filled tube with pressure which is sensed. The tube is pushed via a corresponding recess which runs in the transverse direction into the sealing element which has an additional air tube for sealing purposes. Yet another additional seal, which also has an air tube which runs in the transverse direction, is attached on the edge of the roof opening which frontally adjoins the front edge of the cover when the roof is closed position thereby sealing the motor vehicle roof. The limitation of this openable motor vehicle roof is that it is not possible to selectively change the light incidence with the cover closed.

U.S. Pat. No. 5,592,060 discloses a motor vehicle roof including a cover which can be moved in order to at least partially clear an opening in the solid roof panel and which can also be swivelled out into a ventilation position with the rear edge of the cover protruding upward. This reference also discloses a sealing element which is attached to the front edge of the cover which adjoins the opening edge when the cover is closed in order to seal the motor vehicle interior. A sensor with two opposite electrodes is integrated into the sealing element and when a force exceeding the threshold value acts upon the sensor, the electrodes come into contact with one another due to the resulting deformation, thereby indicating the pinching of an article between the front edge of the cover and the opening edge. Furthermore, this reference discloses a movable headliner which is located underneath the roof opening movable to cover the roof opening or at least to partially clear it. The limitation of this openable motor vehicle roof is that by attaching the sealing element to the cover, the moving mass of the cover is increased and the thickness of the front edge of the cover is also increased. In addition, another limitation is that there is no protection against pinching with respect to the movable headliner.

SUMMARY OF THE INVENTION

A primary object of the present invention is to provide a motor vehicle roof which in the closed state, allows selectively variable light incidence.

A second object of the present invention is to provide such a motor vehicle roof which provides superior sealing of the motor vehicle interior.

A third object of the present invention is to provide such a motor vehicle with provisions to protect against pinching.

These and other objects are achieved by providing a motor vehicle roof in accordance with the present invention including a roof panel with a roof opening, at least partially transparent cover which covers the roof opening and being selectively movable to at least partially clear the roof opening, a headliner positioned underneath the roof opening and being selectively movable to at least partially clear the roof opening, a sealing element mounted to the roof panel in a manner that the sealing element adjoins the cover from underneath the cover to seal the motor vehicle roof when the cover is in a closed position, and a sensor provided in the sealing element for sensing application of force in excess of a threshold value which is indicative of an object being pinched between a front edge of the roof opening and at least one of the cover and/or the headliner. This embodiment has the advantage in that by moving the movable headliner, the light incidence can be changed even with the cover closed. In addition, protection against pinching by the movable headliner is also ensured without use of additional components.

In one embodiment of the present invention, the cover is adapted to be swivelled outwardly in a ventilation position where a rear edge of the cover protrudes up and out of the plane of the roof panel. In addition, the sealing element is mounted on the roof part in a manner that the sealing element adjoins the cover in the ventilation position as well as in the closed position. This has the advantage in that the wind noise in the motor vehicle interior is reduced even in the ventilation position.

In another embodiment of the present invention, a wind deflector is provided positioned proximate to the front edge of the roof opening, the wind deflector being adapted to automatically swivel outwardly when the cover is at least partially opened. In this embodiment, the sealing element engages the wind deflector when the cover is in the closed position as well as when the cover is in the ventilation position thereby preventing rattling of the wind deflector. This embodiment reduces any adverse effect on the motor vehicle passengers when driving with the wind deflector not raised without requiring additional components.

In one embodiment of the present invention, the sealing element includes a sealing lip positioned toward the front of the sealing element. The sealing lip projects upwardly and adjoins the wind deflector from underneath when the cover is in the closed position. This represents an especially simple implementation to accomplish the sealing function of the sealing element.

In another embodiment of the present invention, the sealing element includes a bead area at a rear area of the sealing element. The bead area includes a cavity for receiving a sensor which extends in a transverse direction of the roof panel. This embodiment represents a simple configuration of the present invention with good operating reliability.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
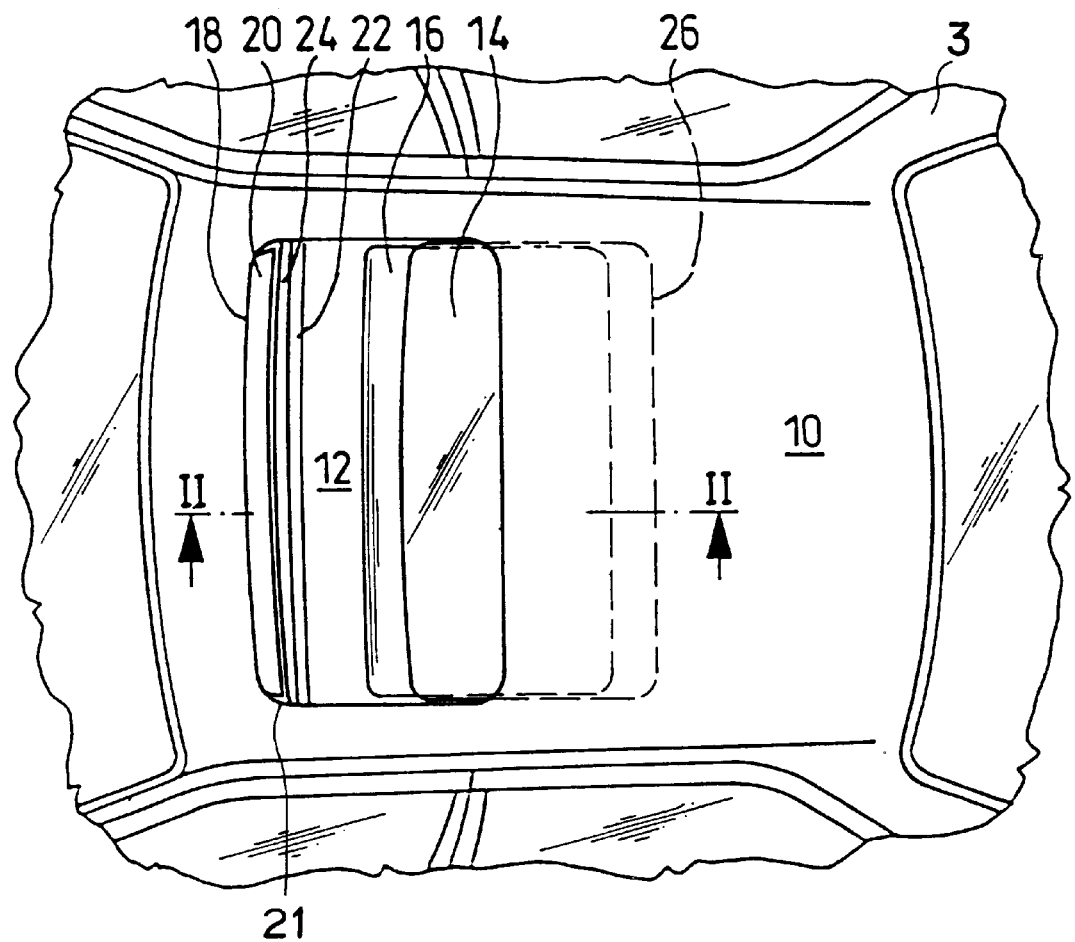
FIG. 1 shows an overhead view of a motor vehicle roof in accordance with the present invention with the cover and headliner in a partially opened position.

FIG. 1 illustrates an openable motor vehicle roof 1 for a motor vehicle 3 (only part of which is shown) in accordance with one embodiment of the present invention. Whereas the illustrated openable motor vehicle roof 1 is of the type commonly referred to as moon roof and sun roof, it should be understood that the present invention may also be applied to other types of openable roofs including sliding roofs, folding roofs, slated roofs, or spoiler roofs. It should also be noted that the terms "front" and "back" referred to hereinbelow relates to the normal direction of travel of the vehicle 3 on which the openable motor vehicle roof 1 is provided. In addition, the term "cover" should be understood in a general manner and can also encompass multi-part cover elements.

As shown in FIG. 1, the roof panel 10 is provided with a roof opening 12 that is closable with a cover 14 which, in the present embodiment, may be transparent and be made from glass. The cover 14 can be moved in a lengthwise direction of the motor vehicle 3 to clear the roof opening 12 selectively in part or in its entirety, thus, allowing adjustment of the amount of the roof opening 12 which is uncovered by cover 14. In addition, in the present embodiment, the cover 14 can be swivelled outwardly into a ventilation position from a closed position so that the rear edge 26 of the cover 14 protrudes up and out of the plane of the roof panel 10. Underneath the cover 14, there is provided a headliner 16, which in a closed position, also closes the roof opening 12. In this regard, the headliner 16 may be moved in the lengthwise direction of the motor vehicle 3 to clear the roof opening 12 selectively in part, or in its entirety, when the cover 14 is either closed or is swivelled outwardly. The drive and the control (not shown) for operating and controlling the cover 14 and the headliner 16 may be provided in the manner know in the art such as described in the German reference DE 195 13 971 C2. In FIG. 1, the cover 14 and the headliner 16 are each shown in a partially open position. In addition, as can also be seen in FIG. 1, the presently described embodiment is also provided with a wind deflector 20 on the front edge 18 of the roof opening 12. The wind deflector 20 is provided with elastic prestressed members such as springs (not shown) which automatically swivels a back end 21 of the wind deflector 20 out and upward at an angle to reduce the driving wind noise caused by turbulence.

Figure 2:
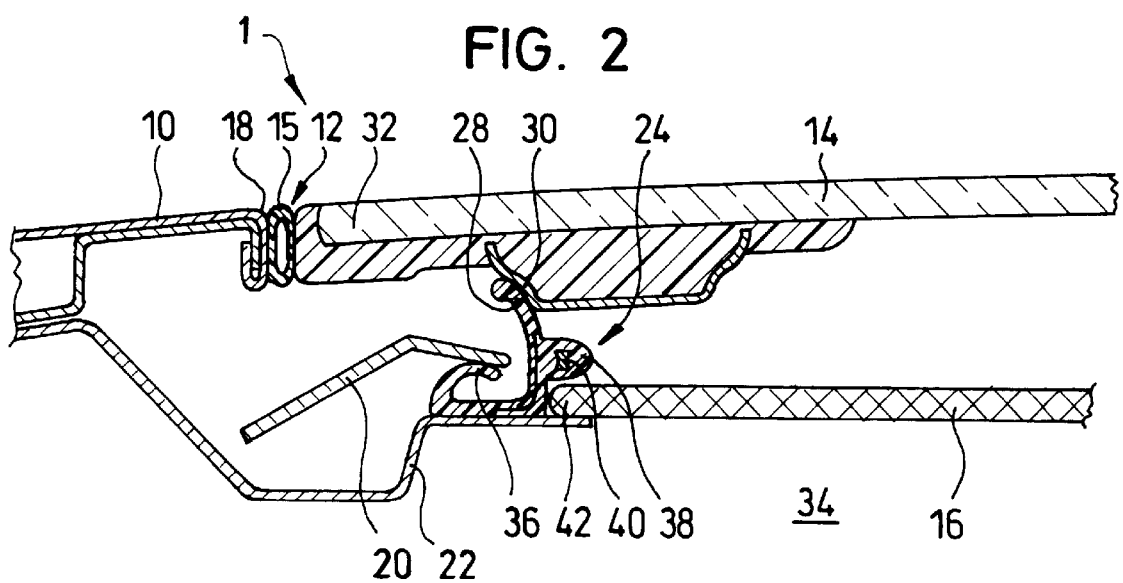
FIG. 2 shows a cross sectional view of one embodiment of the motor vehicle roof in accordance with the present invention as viewed along line II—II but with the cover and headliner being shown in a closed position.

FIG. 2 shows a cross sectional view of the openable motor vehicle roof 1 of FIG. 1 but with the cover 14 and the headliner 16 both in closed positions. As can be seen, a seal 15 is provided on the front edge 18 of the roof opening 12 with which the front edge 32 of the cover 14 adjoins when the cover 14 is in a closed position. Alternatively, the seal 15 can be located on the cover 14 itself instead of the roof opening 12. In accordance with the illustrated embodiment, there is also provided a roof part 22 which is fixedly mounted to the roof panel 10 and which projects into the roof opening 12. A sealing element 24 is mounted on the roof part 22, the sealing element 24 extending in the transverse direction of the motor vehicle 3. Towards the front of the sealing element 24, a first sealing lip 36 is provided which, in the present embodiment, adjoins the back end 21 of the wind deflector 20 from underneath when the wind deflector 20 is pushed down as is the case when the cover 14 is not pushed back, i.e. the cover is in a closed or ventilation position. This first sealing lip 36 acts to reduce the rattling noise of the wind deflector 20. The sealing element 24 also includes a second sealing lip 28 which projects upwardly to adjoin the cover bottom 30 in the area of the front edge 32 of the cover 14 thereby providing additional sealing for the front edge 32 of the cover 14. The second sealing lip 28 of the sealing element 24 acts to further reduce wind noise in the motor vehicle interior 34 near the front opening edge 18 when the cover 14 is either in its closed position, or is swivelled outwardly in the ventilation position. As can also be seen, the front edge 42 of the headliner 16 adjoins with the sealing element 24.

A separate elastic bead area 38 is provided in the present embodiment in the rear area of the sealing element 24. An antipinching sensor 40 which extends in the transverse direction of the vehicle is provided in a cavity of the elastic bead area 38. The antipinching sensor 40 in the present embodiment operates as a pressure sensor by measuring resistance and in this embodiment, is provided over the entire width of the roof opening 12. As can be seen, the antipinching sensor 40 is located above the headliner 16 and below the bottom 30 of the cover 14 in the illustrated embodiment. The antipinching sensor 40 is made such that when a threshold value of force exerted on the bead area 38 (thus on the sensor 40) is exceeded, a signal is generated which causes the drive control unit (not shown) to interrupt the closing of the cover 14 and headliner 16 and, in the present embodiment, actually reverses the drive in order to clear the roof opening 12 as quickly as possible. As can be readily appreciated, the threshold value of force exerted on the bead area 38 can be exceeded when a body part of a vehicle occupant or another article ends up between the front edge 18 of the roof opening 12 and the front edge 32 of the cover 14 and/or the front edge 42 of the headliner 16. This case can also occur when the headliner 16 is closed with the cover 14 already in its closed or ventilation positions. In this manner, the antipinching sensor 40 offers pinch protection to prevent injury to a vehicle occupant or damage to the article and/or the components of the openable motor vehicle roof 1 such as the drive or the sealing element 24. Thus, the sealing element 24 performs the following functions at the same time: seals the motor vehicle interior 34 at the front edge 18 of the cover 14 with the cover 14 in its closed or ventilation positions; allows determination of an object being pinched by the cover 14 and/or the headliner 16; and suppresses rattling noise of the wind deflector 20 with the cover 14 in its closed or ventilation positions. In this regard, the sealing element 24 may be made from EDPM or similar material and the bead area 38 and the sealing lips 36 and 28 may be made to have different hardness or even be made of different materials, for example, extruded thermoplastic.

Figure 3:
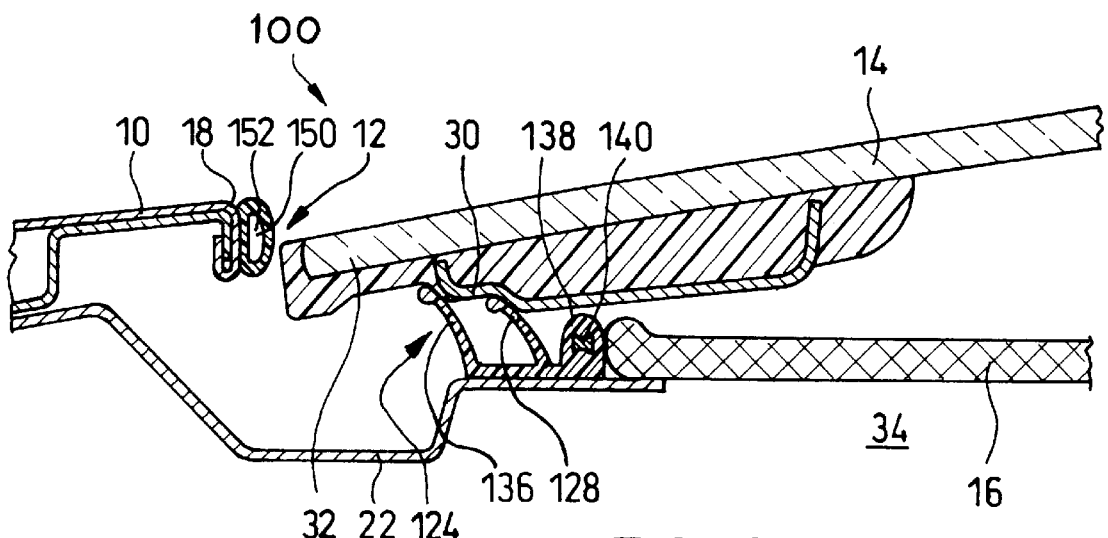
FIG. 3 shows a cross sectional view of another embodiment of the motor vehicle roof in accordance with the present invention with the cover in a ventilation position.

FIG. 3 shows a second embodiment of the present invention with the cover 14 swivelled outwardly in a ventilation position. This embodiment of the openable motor vehicle roof 100 differs from the first embodiment shown in FIGS. 1 and 2 mainly in that there is no wind deflector and the sealing element 124 is different. A seal 152 of elastic material is attached to the front edge 18 of the roof opening 12 and the seal 152 abuts the front edge 32 of the cover 14 when the cover 14 is in its closed position. The seal 152 includes a cavity 150 running in the transverse direction which allows slight compression of the seal 152 which acts togther with the sealing element 124 described hereinbelow to provide sealing of the motor vehicle interior 34.

As can be seen, the sealing element 124 is made of a single piece. A first sealing lip 136 and a second sealing lip 128 is provided in toward the front of the sealing element 124. The sealing lips 136 and 128 project upwardly essentially parallel to one another and adjoin the bottom 30 of the cover 14 and provide for a double sealing action when the cover 14 is in its closed position or is swivelled outwardly in its ventilation position. The bead area 138 of the sealing element 124 contains a pinching sensor 140 and is oriented 90 degrees relative to the bead area 38 of the prior embodiment. The bead area 138 rests directly on the roof part 22 and the sensor 140 lies roughly in the plane of the headliner 16 so that when the headliner 16 is in its closed position, the front edge 42 of the headliner 16 adjoins the bead area 138 as clearly shown in FIG. 3. The sensor 140 of the present embodiment may also be made of EDPM. and functions analogously to the sensor 40 discussed above relative to the embodiment of FIG. 2. Thus, the details of its function is omitted here to avoid repetition.

Figure 4:
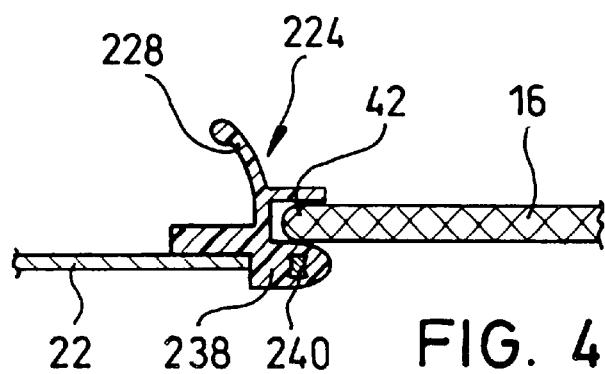
FIG. 4 shows a portion of yet another embodiment of the motor vehicle roof in accordance with the present invention.

Another embodiment of the present invention is shown in FIG. 4 but with only few of the components being illustrated. FIG. 4 shows a sealing element 224 positioned on the roof part 22 such that its bead area 238, which includes an antipinching sensor 240, is positioned on the roof opening 12 in a manner that the antipinching sensor 240 is below the front edge 42 of the slidable headliner 16 when said headliner 16 is in the closed position. This embodiment also includes a first sealing lip 228 which projects upwardly to adjoin the bottom of the cover (not shown) to provide a seal as described relative to the embodiments of FIGS. 2 and 3. Pinching is especially effectively recognized and prevented by this embodiment. Again, the present embodiment functions analogously to the previously disclosed embodiments, and thus, need not be discussed in further detail.

As previously noted, the present invention is not limited to sliding and lifting roofs, but can also be used for example in pure sliding roofs, folding roofs, slatted roofs or spoiler roofs. In addition, the term "cover" should be understood in a general manner and can also encompass multi-part cover elements.

While various embodiments in accordance with the present invention have been shown and described, it is understood that the invention is not limited thereto. The present invention may be changed, modified and further applied by those skilled in the art. Therefore, this invention is not limited to the details shown and described previously, but also includes all such changes and modifications which are encompassed by the appended claims.

What is claimed is:

1. Motor vehicle roof comprising:
   a fixed roof structure having a roof panel with a roof opening;
   an at least partially transparent cover which has a closed position in which the cover closes said roof opening, said at least partially transparent cover being selectively movable from said closed position to at least partially expose said roof opening;
   a headliner positioned underneath said roof opening, said headliner being selectively movable to at least partially expose said roof opening;
   a sealing element mounted to said roof structure in a manner that said sealing element adjoins said cover, from underneath said cover, in an area proximate to a front edge of said cover, thereby sealing the motor vehicle roof when said cover is in said closed position; and
   a sensor provided in said sealing element for sensing application of force in excess of a threshold value which is indicative of an object being pinched between a front edge of said roof opening and at least one of said at least partially transparent cover and said headliner.

2. Motor vehicle roof of claim 1, wherein said at least partially transparent cover is adapted to be pivoted outwardly into a ventilation position where a rear edge of said at least partially transparent cover protrudes up and out of a plane of the roof panel; and wherein said sealing element is mounted on said roof structure in a manner that said sealing element adjoins said cover from underneath said cover in an area proximate to a front edge of said cover in said ventilation position as well as in said closed position.

3. Motor vehicle roof of claim 2, further comprising a wind deflector positioned proximate to said front edge of said roof opening, said wind deflector being adapted to automatically pivot outwardly when said at least partially transparent cover is at least partially opened; and wherein said sealing element engages said wind deflector when said at least partially transparent cover is in said closed position as well as when said at least partially transparent cover is in said ventilation position, thereby preventing rattling of said wind deflector.

4. Motor vehicle roof of claim 3, wherein said sealing element includes a first sealing lip positioned toward the front of said sealing element, said first sealing lip projecting upward to adjoin said wind deflector from underneath when said at least partially transparent cover is in said closed position.

5. Motor vehicle roof of claim 4, wherein said sealing element includes a second sealing lip which projects upwardly to adjoin said at least partially transparent cover.

6. Motor vehicle roof of claim 1, wherein said sealing element includes two sealing lips positioned in succession on said sealing element and said two sealing lips extend upwardly to adjoin said at least partially transparent cover.

7. Motor vehicle roof of claim 1, wherein said sensor is a pressure sensor which measures pressure by measuring resistance.

8. Motor vehicle roof of claim 1, wherein said sealing element includes a bead area with a cavity for receiving said sensor which extends in a transverse direction of said roof panel.

9. Motor vehicle roof of claim 1, wherein said sensor is positioned above said headliner.

10. Motor vehicle roof of claim 1, wherein a front edge of said headliner adjoins said sealing element when said headliner is in a closed position.

11. Motor vehicle roof of claim 1, wherein a front edge of said headliner substantially abuts said sealing element when said headliner is in a closed position.

12. Motor vehicle roof of claim 1, wherein said sealing element is made of EDPM.

13. Motor vehicle roof of claim 1, wherein said sealing element is mounted to a roof part of said roof structure, said roof part projecting into said roof opening.

14. Motor vehicle roof of claim 1, further comprising a seal disposed between said front edge of said at least partially transparent cover and a front edge of said roof opening for additionally sealing said motor vehicle roof when said at least partially transparent cover is in a closed position.

15. Motor vehicle roof of claim 1, wherein said sensor is disposed in a manner to be positioned below a front edge of said sliding headliner when said sliding headliner is in said closed position.

* * * * *